(12) United States Patent
Liang

(10) Patent No.: US 8,373,682 B2
(45) Date of Patent: Feb. 12, 2013

(54) STYLUS HAVING RETRACTED AND EXTENDED POSITIONS

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 272 days.

(21) Appl. No.: 12/840,415

(22) Filed: Jul. 21, 2010

(65) Prior Publication Data

US 2011/0193826 A1 Aug. 11, 2011

(30) Foreign Application Priority Data

Feb. 8, 2010 (CN) .......................... 2010 1 0301389

(51) Int. Cl.
*G06F 3/033* (2006.01)
*B41B 1/00* (2006.01)
*B43K 24/02* (2006.01)
*B43K 7/12* (2006.01)
*B43K 5/16* (2006.01)

(52) U.S. Cl. ........... 345/179; 81/9.2; 401/107; 401/108; 401/116

(58) Field of Classification Search ................. None
See application file for complete search history.

(56) References Cited

U.S. PATENT DOCUMENTS

| 5,889,512 | A * | 3/1999 | Moller et al. ............. 345/179 |
| 2003/0077103 | A1* | 4/2003 | Kim ............................ 401/68 |
| 2003/0184529 | A1* | 10/2003 | Chien et al. ................ 345/179 |
| 2008/0131189 | A1* | 6/2008 | Yoon ........................... 401/116 |

* cited by examiner

*Primary Examiner* — Alexander S Beck
*Assistant Examiner* — Kirk Hermann
(74) *Attorney, Agent, or Firm* — Altis Law Group, Inc.

(57) ABSTRACT

A stylus comprises a housing, a stylus body and a shaft. The housing has a receptacle defined therethrough. The stylus body assembly is slidably and non-rotatably accommodated in the receptacle of the housing, the stylus body assembly includes a threaded hole defined therethrough. The shaft rotatably passes through the housing, the shaft includes a threaded portion engaging with the threaded hole such that rotation of the shaft relative to the housing causes the stylus body assembly to slide relative to the housing to extend out or retract into the housing.

14 Claims, 7 Drawing Sheets

STYLUS HAVING RETRACTED AND EXTENDED POSITIONS

BACKGROUND

1. Technical Field

This exemplary disclosure generally relates to retractable/extendable styluses.

2. Description of Related Art

It is well-known that a variety of devices include a touch screen. Examples of such devices include smart phones, personal digital assistants (PDA), pagers, personal organizers, and the like. These devices typically include a display module under the touch screen. The display module generates target images associated with menu options, programs, user choices, and other operations. The user controls the device by pressing the touch screen over the target image with a stylus. However, typical styluses can be inconvenient to retract or extend.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
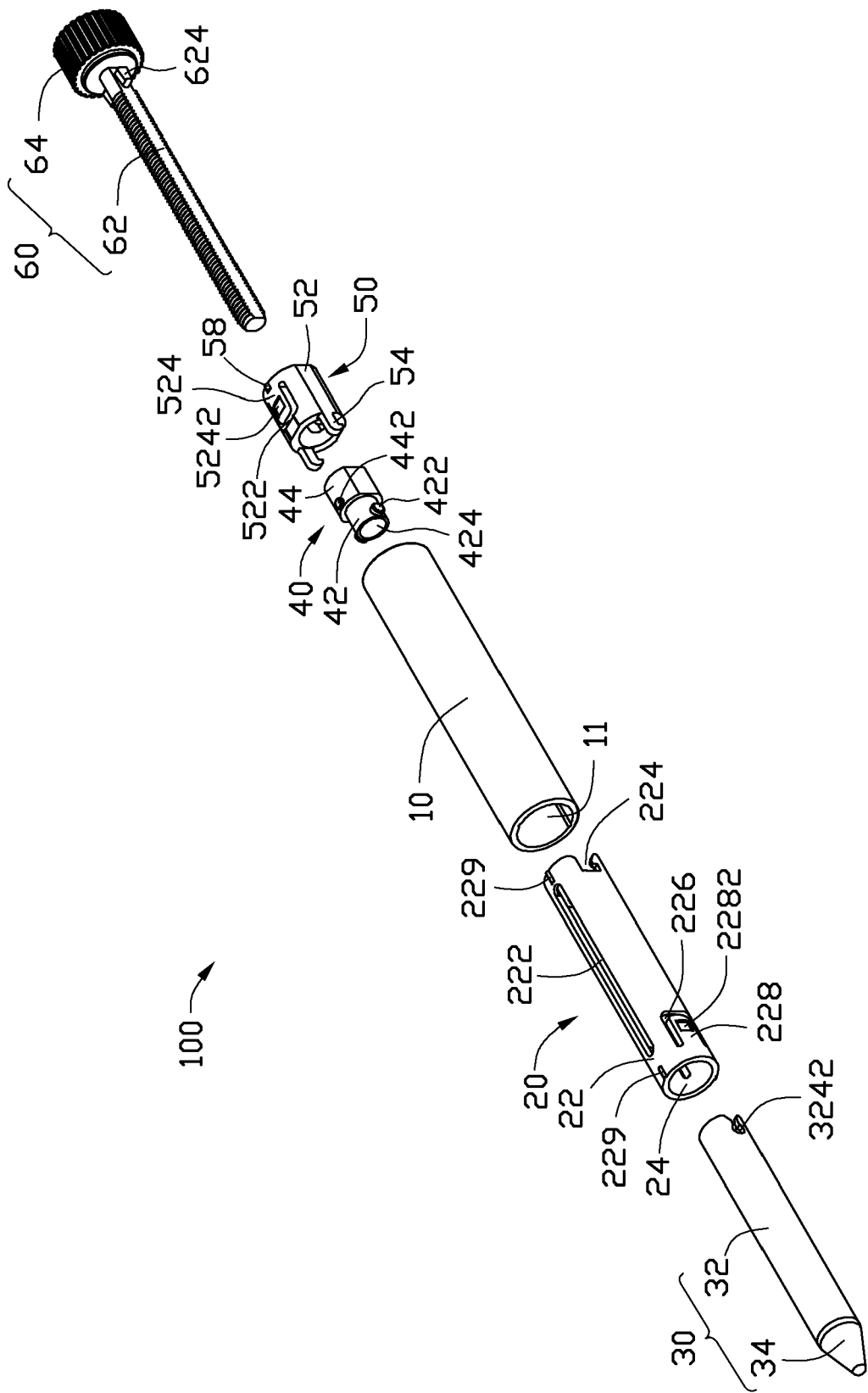
FIG. 1 is an exploded view of an exemplary stylus.

Referring to FIG. 1, a stylus 100 includes a housing 10, a guiding element 20, a stylus body 30, a cam 40, a retaining element 50 and a shaft 60. The guiding element 20 is mounted in the housing 10; the stylus body 30 is mounted to the cam 40; the cam 40 is slidably mounted to the guiding element 20; the retaining element 50 is mounted in the housing 10; the shaft 60 is rotatably mounted to the retaining element 50 so the shaft 60 can rotate relative to the housing 10, and the shaft 60 engages with the cam 40 so the cam 40 can rotate relative to the shaft 60.

Figure 2:
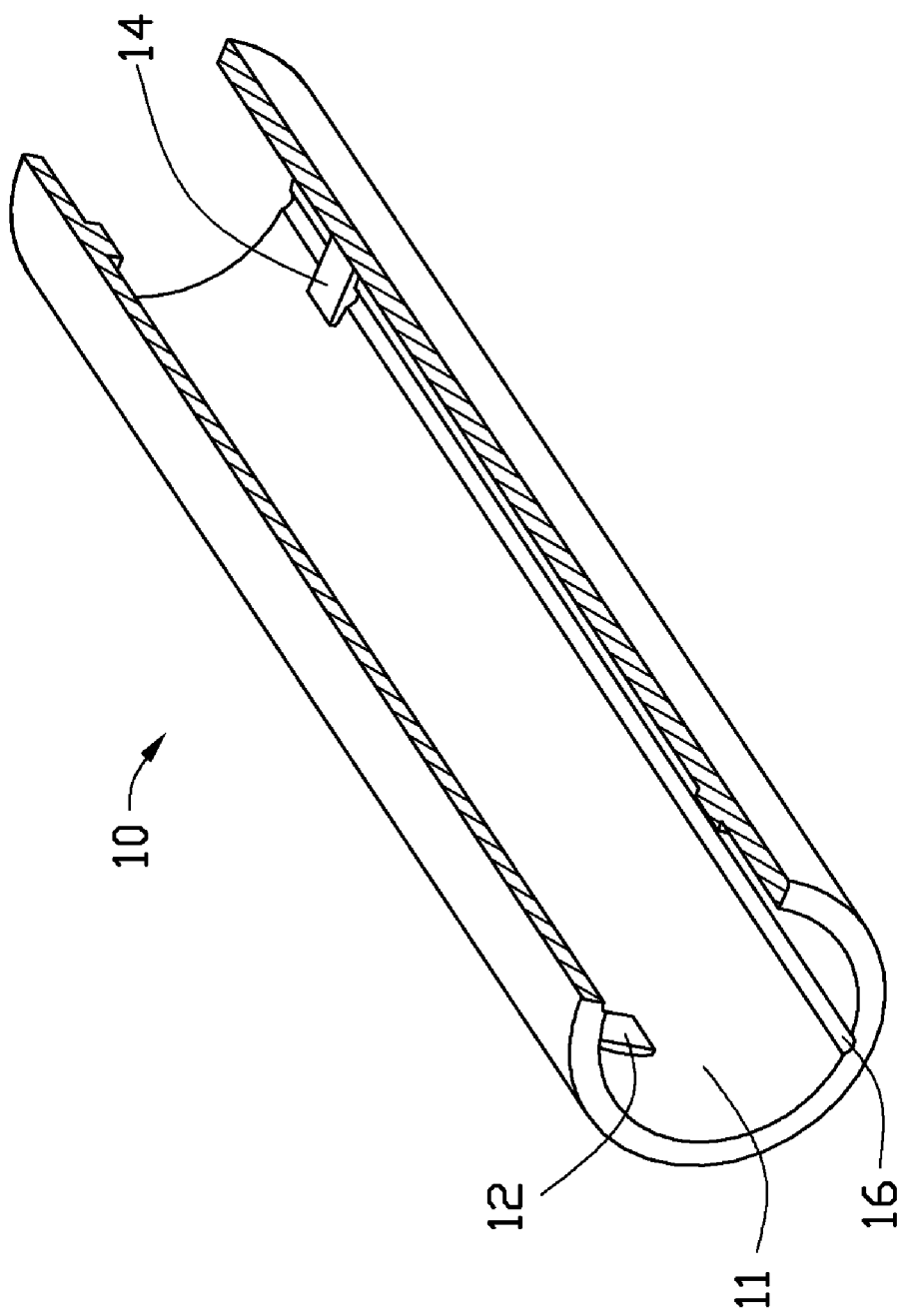
FIG. 2 is a cut-away view of a housing of the stylus shown in FIG. 1.
Figure 3:
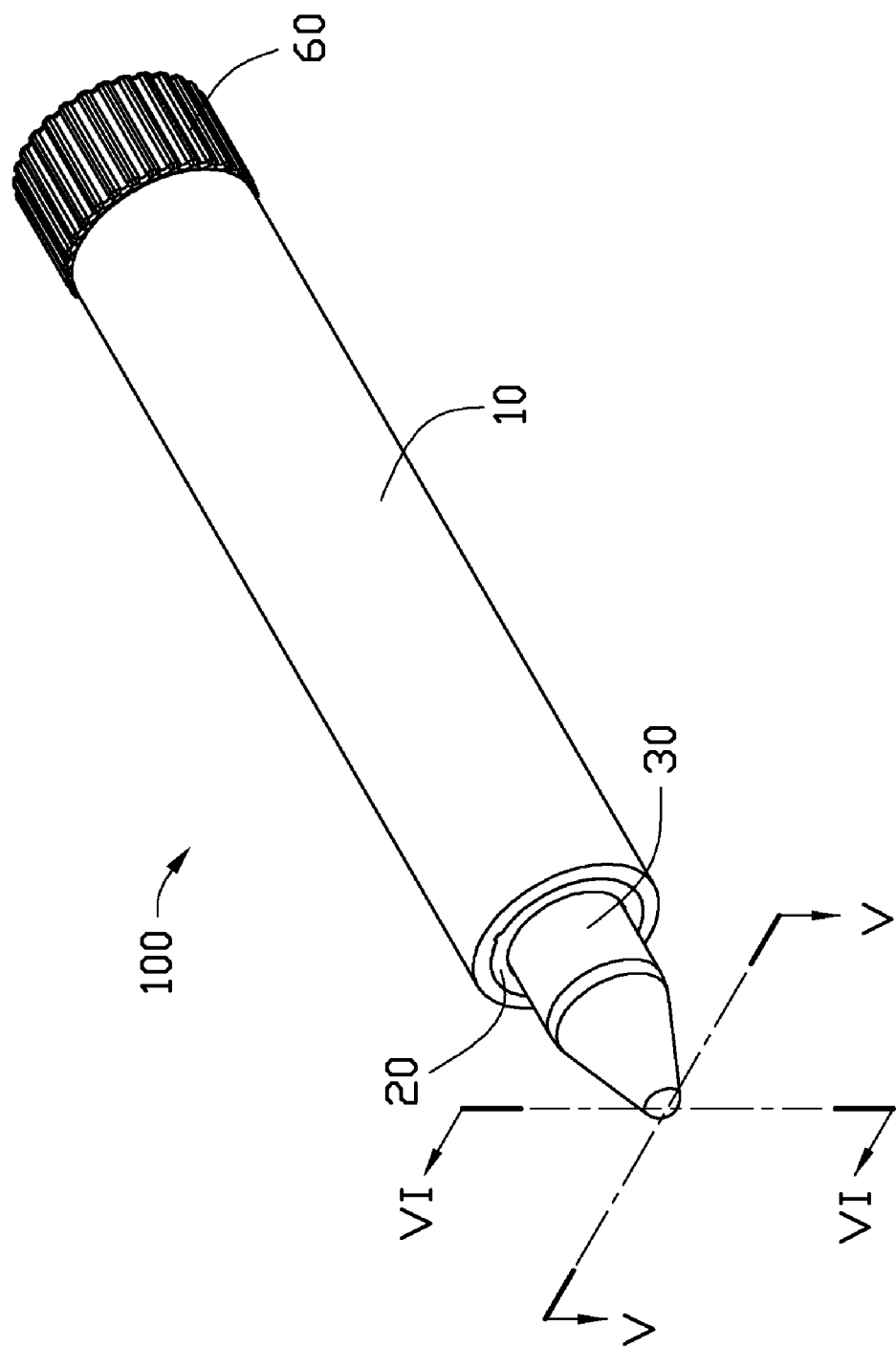
FIG. 3 is an assembled view of the stylus shown in FIG. 2.
Figure 4:
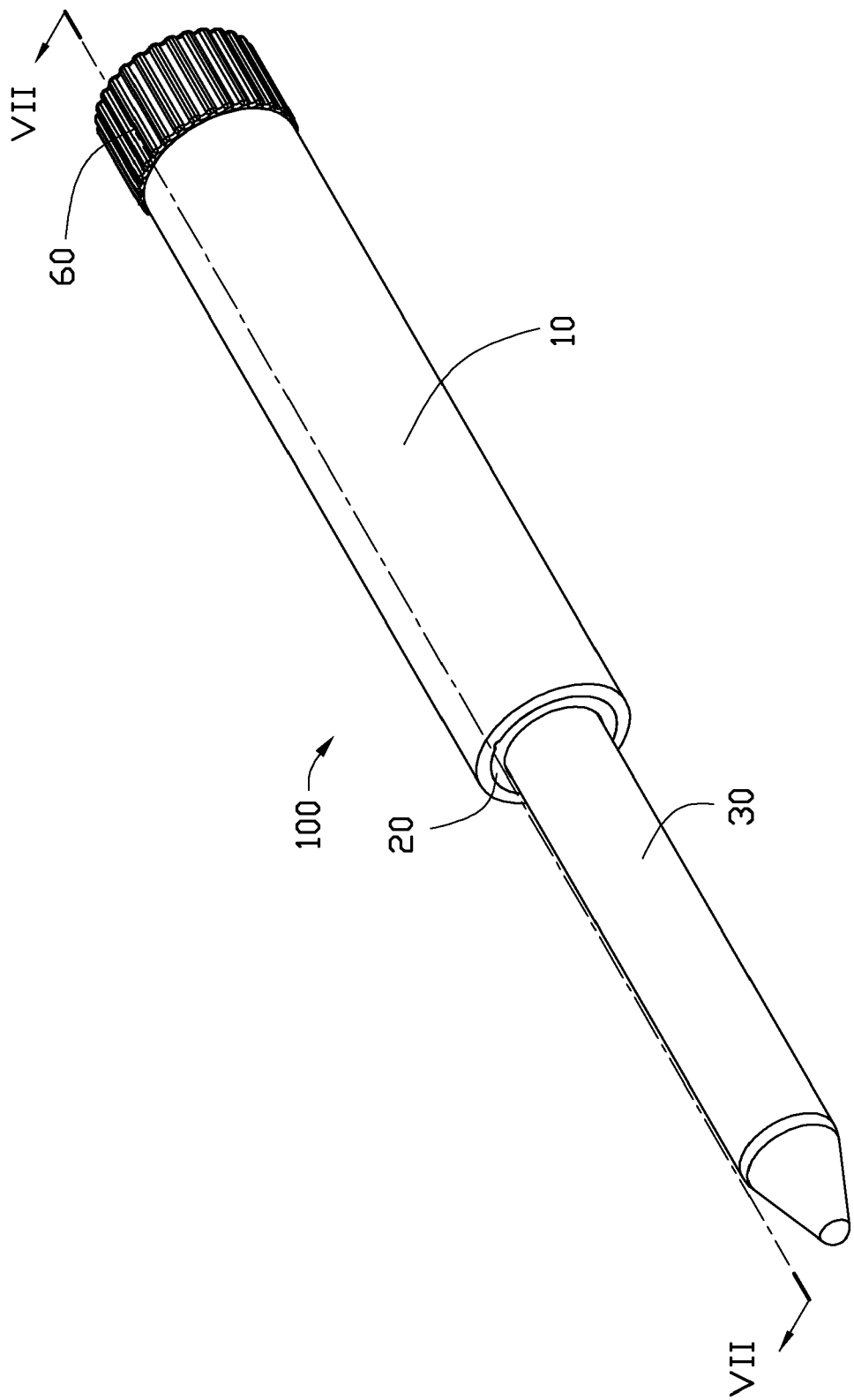
FIG. 4 is similar to FIG. 3, but the stylus is in an extended position.

Referring to FIG. 2, the housing 10 is hollow, and includes a receptacle 11 defined longitudinally therethrough and two opposite latching portions 12 positioned in an inner wall thereof and located at/near one end thereof. The latching portions 12 latch with the guiding element 20 to hold the guiding element 20 in the housing 10. The housing 10 further includes two opposite ribs 14 positioned in the inner wall thereof and located at/near another end thereof. The ribs 14 latch with the retaining element 50 to hold the retaining element 50 in the housing 10. The housing 10 may further define two opposite positioning grooves 16 from one end thereof to another end thereof. The positioning grooves 16 are for preventing the rotating of the guiding element 20 relative to the housing 10.

The guiding element 20 is hollow, and includes a peripheral wall 22 that encloses a chamber 24. The guiding element 20 has two diametrically opposed guiding grooves 222 longitudinally defined through the peripheral wall 22. The guiding grooves 222 are for guiding the cam 40 to slide relative to the guiding element 20 so the cam 40 can slide relative to the housing 10. The guiding element 20 further has two notches 224 defined at one end thereof and two U-shaped channels 226 defined at another end thereof. The notches 224 are aligned each other and are for latching the retaining element 50 to the guiding element 20. The U-shaped channels 226 define through the peripheral wall 22, so one cantilever 228 is defined by each channel 226. Each cantilever 228 has a latching slot 2282 defined therein facing away from another cantilever 228. Each latching slot 2282 latches with one of the latching portions 12 to hold the guiding element 20 in the housing 10. The guiding element 20 may further includes a plurality of positioning strips 229 respectively protruding from an outer surface thereof. The positioning strips 229 are received in the positioning grooves 16 of the housing 10 to prevent the guiding element 20 from rotation relative to the housing 10.

Figure 5:
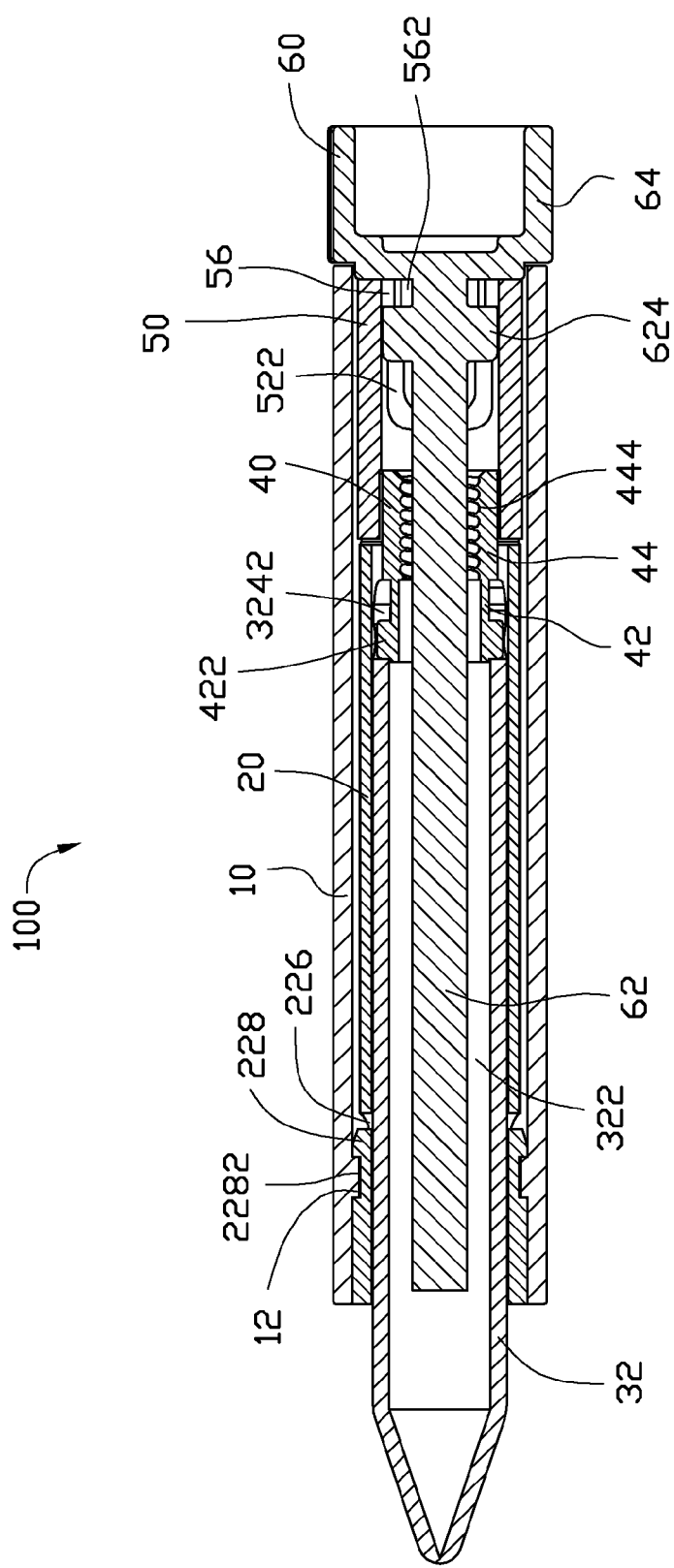
FIG. 5 is a cross-sectional view of the stylus in FIG. 3 along the line V-V, and wherein the stylus is in a close position.

Referring to FIGS. 1 and 5, the stylus body 30 is received within the receptacle 11 of the housing 10 and partially extends out of the housing 10. The stylus body 30 is used to contact a touch screen display of an electronic device (now shown). The stylus body 30, in this embodiment, may include a body 32 and a head 34 protruding from one end of the body 32. The body 32 has generally the same shape as, but slightly smaller than, the receptacle 11 of the housing 10, so the body 32 can be slidably fitted in the receptacle 11. The stylus body 30 further includes a compartment 322 longitudinally defined in another end of the body 32 opposite to the head 34, for accommodating the shaft 60 like shown in FIG. 5. The stylus body 30 further includes two aligned latching holes 3242 defined therethough for latching the cam 40 to the stylus body 30.

The cam 40 includes a retaining portion 42 and a sliding portion 44 connecting with the retaining portion 42. The retaining portion 42 has two opposite latching blocks 422 protruding therefrom. The latching blocks 422 are latched in the latching holes 3242 to hold the cam 40 to the stylus body 30. The retaining portion 42 further has an opening 424 defined therethough for the shaft 60 to pass through. The sliding portion 44 has two sliding blocks 442 protruding therefrom. The sliding blocks 442 are slidably accommodated in the guiding grooves 222 so the cam 40 can slide relative to the guiding element 20. The sliding portion 44 further has a threaded hole 444 (see FIG. 5) defined therethrough, and the threaded hole 444 communicates with the opening 424.

Referring to FIGS. 1 and 5, the retaining element 50 includes a tube 52, two hooks 54 protruding from one end of the tube 52, and a flange 56 positioned at an inner surface of the tube 52 opposite to the hooks 54. The tube 52 defines two opposite U-shaped troughs 522, each of which encloses a securing portion 524. Each securing portion 524 has a securing slot 5242 defined therein facing away from another securing portion 524. Each securing slot 5242 latches with one of the latching portions 12 to hold the retaining portion 42 to the housing 10. The tube 52 further includes two raised portions 58 protruding therefrom. The raised portions 58 are accommodated in the positioning grooves 16 so the retaining element 50 cannot rotate relative to the housing 10. Each of the hooks 54 latches in one of the notches 224 to latch the retaining element 50 to the guiding element 20. The flange 56 has an aperture 562 defined therethrough so the shaft 60 can pass through the flange 56.

Figure 6:
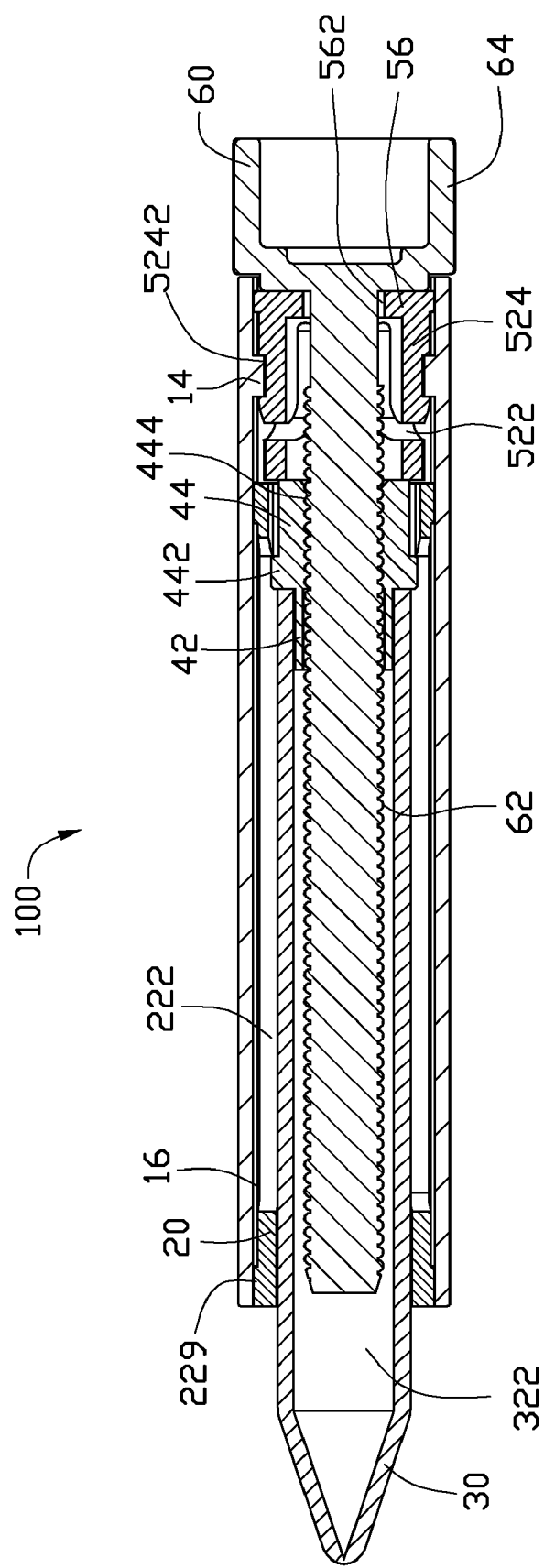
FIG. 6 is a cross-sectional view of the stylus in FIG. 3 along the line VI-VI, and wherein the stylus is in the close position.
Figure 7:
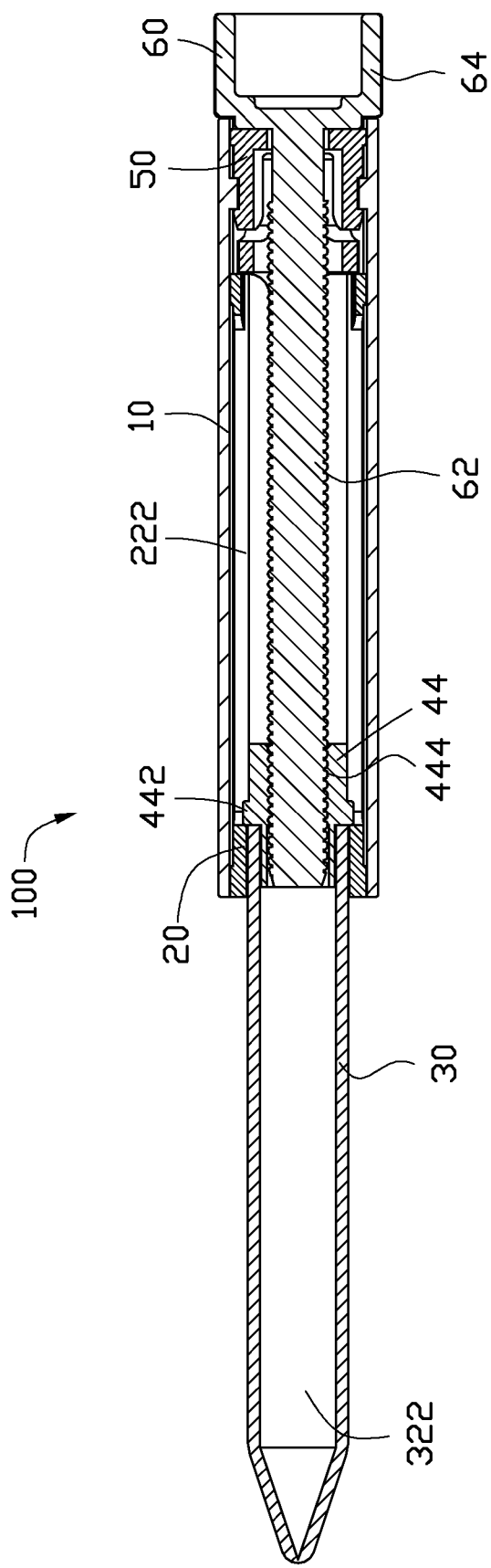
FIG. 7 is similar to FIG. 6, but showing the stylus is in the extended position.

Referring to FIGS. 1, 5, and 6, the shaft 60 includes a threaded portion 62 and an operating portion 64 positioned at one end of the threaded portion 62. The threaded portion 62 engages with the threaded hole 444. The shaft 60 further includes two protrusions 624 protruding from the shaft and positioned between the threaded portion 62 and the operating portion 64, the protrusions 624 are spaced from the operating portion 64. When the shaft 60 is accommodated in the retaining element 50, the flange 56 is held between the operating portion 64 and the protrusions 624, thereby preventing the shaft 60 and the retaining element 50 from separating.

Referring to FIGS. 1, 3, 5 and 6, in assembly, the guiding element 20 is inserted into the housing 10, each positioning strip 229 is positioned in one of the positioning grooves 16, and each latching portion 12 is latched in one of the latching slots 2282 so the guiding element 20 is mounted in the housing 10. Each latching block 422 is latched in one of the latching holes 3242 so the cam 40 is mounted to the stylus body 30. The cam 40/stylus body 30 combination is inserted in the guiding element 20, each sliding blocks 442 is accommodated in one of the guiding grooves 222. Each hook 54 latches with one of the notches 224 and each rib 14 latches in one of the securing slots 5242 so the retaining element 50 is firmly mounted in the housing 10. Each raised portion 58 is accommodated in one of the positioning grooves 16 so the retaining element 50 cannot rotate relative to the housing 10. The threaded portion 62 is inserted in the retaining element 50 until the threaded portion 62 resists the cam 40. Then, rotating the operating portion 64 to engage the threaded portion 62 to the sliding portion 44 until the protrusions 624 pass through the aperture 562. At this time, the flange 56 is held between the operating portion 64 and the protrusions 624, thereby preventing the shaft 60 and the retaining element 50 from separating. It is to be noted that the protrusions 624, in this embodiment, are larger than the aperture 562 so the protrusions 624 cannot freely pass through the aperture 562, thereby can prevent the shaft 60 and the retaining element 50 from separating.

Referring to FIGS. 4-7, in use, the shaft 60 is rotated relative to the housing 10, such as by rotation of the operating portion 64. As the threaded hole 444 of the cam 40 engages with the threaded portion 62 of the shaft 60, when the shaft 60 is rotated, the cam 40 should rotate relative to the shaft 60, but the sliding blocks 442 are accommodated in the guiding grooves 222 to limit the rotation of the cam 40 relative to the shaft 60. Thereby, as the shaft 60 rotates, the cam 40 will slide relative to the guiding element 20 along the guiding grooves 222, and the stylus body 30 slides together with the cam 40 relative to the guiding element 20, to extend from or to retract into the housing 10.

It is understood that the stylus body 30 and the cam 40 can be integrated into one stylus body assembly in which the cam 40 may be omitted and the sliding blocks 442 and the threaded hole 444 are disposed at the stylus body 30.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A stylus, comprising:
a housing having a receptacle defined therethrough;
a stylus body assembly slidably and non-rotatably accommodated in the receptacle of the housing, the stylus body assembly including a threaded hole defined therethrough;
a shaft rotatably passing through the housing, the shaft including a threaded portion, an operating portion, and a protrusion, the operating portion positioned at one end of the threaded portion, the protrusion protruding between the threaded portion and the operating portion, the threaded portion engaging with the threaded hole such that rotation of the shaft relative to the housing causes the stylus body assembly to slide relative to the housing to extend out of or retract into the housing, depending upon the direction of rotation of the shaft; and
a retaining element mounted in the housing, the retaining element including a tube, a flange positioned at an inner surface of the tube, the flange held between the operating portion and the protrusions, thereby preventing the shaft and the housing from separating.

2. The stylus as claimed in claim 1, wherein the housing further includes a guiding groove defined therethrough; the stylus body assembly further includes a sliding block slidably accommodated in the guiding groove; when the stylus body assembly slide relative to the housing, the sliding block slides in the guiding groove.

3. The stylus as claimed in claim 2, wherein the tube further includes two raised portions protruding therefrom, the housing further defines two opposite positioning grooves from one end thereof to another end thereof; the raised portions are respectively accommodated in the positioning grooves so the retaining element cannot rotate relative to the housing.

4. The stylus as claimed in claim 2, wherein the tube has two opposite notches defined therein; the housing further includes two opposite ribs positioned in the inner wall thereof; each rib latching with one of the notches to hold the retaining element in the housing.

5. The stylus as claimed in claim 4, wherein the tube defines two opposite U-shaped troughs, each of which encloses a securing portion, each securing slot is defined in one of the securing portions.

6. The stylus as claimed in claim 1, wherein the stylus further includes a guiding element mounted on the housing, the guiding element has a guiding groove longitudinally defined therein, the stylus body assembly includes a sliding block slidably engage with the guiding groove.

7. The stylus as claimed in claim 6, wherein the guiding element has two opposite latching slots defined therein; the housing has two opposite latching portions positioned in an inner wall thereof; each latching slot latches with one of the latching portions to hold the guiding element in the housing.

8. The stylus as claimed in claim 6, wherein the stylus assembly further includes a cam mounted on the stylus body, the threaded hole is defined in the cam.

9. The stylus as claimed in claim 8, wherein the cam includes a retaining portion; the retaining portion has two opposite latching blocks protruding therefrom; the stylus body further includes two aligned latching holes defined therethough; the latching blocks are latched in the latching holes to hold the cam to the stylus body.

10. The stylus as claimed in claim 9, wherein the cam further includes a sliding portion connecting with the retaining portion, the sliding block protrudes from the sliding portion.

11. The stylus as claimed in claim 10, wherein the threaded hole is defined through the sliding portion.

12. The stylus as claimed in claim 11, wherein the retaining portion further has an opening defined therethough for the shaft to pass through, the opening communicates with the threaded hole.

13. The stylus as claimed in claim 1, wherein the stylus body further includes a compartment longitudinally defined one end thereof; the compartment is for accommodating the shaft.

14. A stylus, comprising:
a housing having a receptacle defined therethrough and a guiding groove defined therethrough;
a stylus body retractably accommodated in the receptacle of the housing;
a cam securely mounted to the stylus body, the cam having a threaded hole defined therethrough and slidably and non-rotatably received in the housing and two opposite sliding blocks protruding therefrom;
a shaft rotatably and non-slidably mounted to the housing, the shaft including a threaded portion engaging with the threaded hole; and
a retaining element mounted in the housing; the retaining element including a tube, the flange being positioned at an inner surface of the tube;
wherein the shaft further includes an operating portion positioned one end of the threaded portion and a protrusion protruding between the threaded portion and the operating portion; the housing has a flange formed thereon, the flange has an aperture defined therethrough so the shaft can pass through the flange; the flange is held between the operating portion and the protrusions, thereby preventing the shaft and the housing from separating, when the shaft rotates, the sliding block slides in the guiding groove so the cam slides relative to the housing.

* * * * *